(12) United States Patent
Menezes et al.

(10) Patent No.: US 9,162,756 B2
(45) Date of Patent: Oct. 20, 2015

(54) LANDING GEAR

(75) Inventors: Robert Menezes, Bristol (GB);
Matthew Hilliard, Liverpool (GB);
Peter Michaelides, Cheltenham (GB)

(73) Assignee: Messier-Dowty Limited, Gloucestershire (GB)

( * ) Notice: Subject to any disclaimer, the term of this patent is extended or adjusted under 35 U.S.C. 154(b) by 150 days.

(21) Appl. No.: 13/698,445

(22) PCT Filed: May 19, 2011

(86) PCT No.: PCT/GB2011/050950
§ 371 (c)(1),
(2), (4) Date: Dec. 13, 2012

(87) PCT Pub. No.: WO2011/148158
PCT Pub. Date: Dec. 1, 2011

(65) Prior Publication Data
US 2013/0146704 A1    Jun. 13, 2013

(30) Foreign Application Priority Data
May 25, 2010    (GB) .................................. 1008690.8

(51) Int. Cl.
*B64C 25/26* (2006.01)
*B64C 25/50* (2006.01)
*B64C 25/34* (2006.01)

(52) U.S. Cl.
CPC ................. *B64C 25/50* (2013.01); *B64C 25/34* (2013.01); *B64C 2025/345* (2013.01)

(58) Field of Classification Search
CPC ............................... B64C 25/50; B64C 25/26
USPC .................. 244/100 R, 102 A, 102 SL, 102 R
See application file for complete search history.

(56) References Cited

U.S. PATENT DOCUMENTS

| 5,207,398 A * | 5/1993 | Veaux et al. ............... 244/100 R |
| 5,242,131 A | 9/1993 | Watts |

(Continued)

FOREIGN PATENT DOCUMENTS

| CA | 2665638 | 11/2009 |
| CN | 101596936 | 12/2009 |

(Continued)

OTHER PUBLICATIONS

The State Intellectual Property Office of the People's Republic of China, Chinese Application No. 201180025652.5, Aug. 11, 2014, 14 pages (includes translation pages).

*Primary Examiner* — Benjamin P Lee
(74) *Attorney, Agent, or Firm* — Hunton & Williams LLP

(57) ABSTRACT

A landing gear (10), including: a bogie beam (12); an axle (14) pivotally connected to the bogie beam (12); a locking member (40) coupled to the axle (14) such that movement of the axle (14) invokes movement of the locking member (40), said movement of the locking member (40) defining a swept volume; and a locking mechanism (60) coupled to the bogie beam (12) and including first (65a) and second glide members, (65a, 65b) the locking mechanism (60) being arranged to move the glide members (65a, 65b) between locking positions, where glide members (65a, 65b) are within the swept volume on opposing sides of the locking member (40) and in which position the locking mechanism (60) is arranged to lock the locking member (40) in a predetermined position, and non-locking positions, where the locking mechanism (60) is arranged permit movement of the locking member (40).

20 Claims, 2 Drawing Sheets

(56) References Cited

U.S. PATENT DOCUMENTS

| | | | |
|---|---|---|---|
| 5,333,816 A * | 8/1994 | Del Monte | 244/50 |
| 5,595,359 A | 1/1997 | Meneghetti | |
| 8,376,267 B2 * | 2/2013 | Coles et al. | 244/50 |
| 2010/0078517 A1 * | 4/2010 | Coles et al. | 244/50 |
| 2012/0256050 A1 * | 10/2012 | Hilliard et al. | 244/100 R |
| 2012/0305703 A1 * | 12/2012 | Bennett | 244/102 R |
| 2012/0318909 A1 * | 12/2012 | Bennett | 244/50 |
| 2013/0186998 A2 * | 7/2013 | Bennett | 244/102 R |

FOREIGN PATENT DOCUMENTS

| | | |
|---|---|---|
| FR | 2812613 | 2/2002 |
| WO | WO 2006/071262 | 7/2006 |
| WO | WO 2011098786 A1 * | 8/2011 |
| WO | WO 2011148158 A1 * | 12/2011 |

* cited by examiner

LANDING GEAR

BACKGROUND

Large aircraft are often provided with multi-axle landing gear including a bogie beam carrying a plurality of axles, each axle carrying a plurality of wheels. It is known for one of the axles, generally the rear axle, to be steerable, so as to reduce tyre wear and improve manoeuvrability when the aircraft is taxiing. The steerable axle is generally pivotally connected to the bogie beam. An actuator provided between the bogie beam and the steerable axle can control the orientation of the axle relative to the bogie beam.

As will be appreciated, there are instances where it is desirable for a steerable axle of a landing gear to be locked in a predetermined orientation. Examples are during take-off and landing and during stowage, where it is desirable that the steerable axle is locked in an orientation that is generally orthogonal with respect to the bogie beam and parallel with respect to the other axles on the bogie beam. Such landing gears are therefore provided with a locking device for locking the orientation of the steerable axle relative to the bogie beam.

A known way of providing a locking device is to provide a locking actuator. For example, the steering actuator may be configured to lock when it is at a predefined extension state, corresponding to the extension state required to provide the desired locking orientation of the axle.

A further known locking device is to provide a slot extending into the steerable axle in a manner substantially orthogonal with respect to the longitudinal axis of the axle. A wedge may be provided that is movable between a first position where the wedge is housed within the slot, so as to prevent the steerable axle pivoting about the bogie, and a second position where the wedge is removed from the slot, to allow the axle to pivot.

Both the above-mentioned types of locking device can be noisy during operation because of the fact that unlocking generally occurs under load.

Furthermore, the above-mentioned types of locking device suffer from a disadvantage in that it can be difficult to accurately move the axle to the correct locking orientation before the lock can engage. This can be problematic when the bogie beam bends under static load. As will be appreciated by a person skilled in the art, because the steering actuator is provided between the bogie beam and the steering axle, deflection of the bogie beam can attempt to cause the axle to pivot. This is due to the deflection of the bogie beam causing a change in the straight line distance between the point where the axle connects to the bogie beam and the point where the steering actuator connects to bogie beam. When the lock is released the axle will pivot, and if it moves far enough it may prevent the lock from re-engaging, even though the steering actuator is in its centred position.

Another example of when locking can be problematic occurs if an internally locking actuator is powered to a centred position defined by a control system with a follow-up sensor, or by internal differential area, and the lock position does not exactly coincide with this driven position, due to tolerances, such that the internal lock element does not engage with its mating feature.

In the event of loss of active (electrical) control, an axle will typically move towards its central position due to the pneumatic trail effect or hydraulic means. A locking element of known landing gear may not be able to engage with the axle before the axle passes and overshoots its central position, resulting in the axle oscillating before it is eventually locked.

SUMMARY OF THE INVENTION

In accordance with a first aspect of the present invention, there is provided a landing gear, including:
a bogie beam;
an axle pivotally connected to the bogie beam;
a locking member coupled to the axle such that movement of the axle invokes movement of the locking member, said movement of the locking member defining a swept volume; and
a locking mechanism coupled to the bogie beam and including first and second glide members, the locking mechanism being arranged to move the glide members between locking positions, where glide members are within the swept volume on opposing sides of the locking member and in which position the locking mechanism is arranged to lock the locking member, and thus the axle, in a predetermined position, and non-locking positions, where the locking mechanism is arranged permit movement of the locking member.

Thus, the glide members are used to maintain the position, or orientation, of the locking member and thus the axle. During unlocking, a glide member glides against a surface of the locking member, thus providing low-friction unlocking, as the glide member moves from the locking to the non-locking position, which may provide quiet unlocking even when the locking member is loading the glide member due to a rotational force being applied to the axle.

The locking member may include a cam surface, the cam surface including first and second locking regions and a first guide region, the locking member and/or locking mechanism being arranged such that, with the locking member in a first position, movement of the first glide member from the non-locking position towards the locking position causes the first glide member to move into contact with the first guide region of the cam surface and, thereafter, movement of the locking member from the first position towards a second position causes the first glide member to travel along a portion of the first guide region towards the first locking region.

The cam surface of the locking member may include a second guide region, the first locking region being between the first guide region and second guide region, the locking member and/or locking mechanism being arranged such that, with the locking member in a third position, the locking member moving through the second position when moving between the first and third positions, movement of the first glide member from the non-locking position towards the locking position causes the first glide member to move into contact with the second guide region of the cam surface and thereafter, movement of the locking member from the third position towards the second position causes the first glide member to travel along a portion of the second guide region towards the first locking region.

The locking member and/or locking mechanism may be arranged such that, with the locking member in the third position, movement of the second glide member from the non-locking position towards the locking position causes the second glide member to move into contact with the first guide region of the cam surface and, thereafter, movement of the locking member from the third position towards the second position causes the second glide member to travel along a portion of the first guide region towards the second locking region.

The cam surface of the locking member may include a third guide region, the second locking region being between the first guide region and third guide region, the locking member and/or locking mechanism being arranged such that, with the locking member in the first position, movement of the second glide member from the non-locking position towards the locking position causes the second glide member to move into contact with the third guide region of the cam surface and thereafter, movement of the locking member from the first position towards the second position causes the second glide member to travel along a portion of the third guide region towards the second locking region.

The cam surface of the locking member may be generally symmetrical, the axis of symmetry bisecting the first guide region.

The first and second glide members may be mounted on first and second respective mounting arms.

Each mounting arm may be pivotally mounted to pivotally move the first and second glide members between the locking and non-locking positions.

With the first and second glide members in the locking positions, the locking device may be arranged with the mounting arms positioned such that a force opposing movement of the locking member, applied by the mounting arm to the locking member through the respective glide member, has substantially no lateral component.

The landing gear may include an actuator coupling the mounting arms, the actuator being arranged to move the mounting arms so as to move the glide members between the locking and non-locking positions.

The landing gear may include resiliently deformable biasing means coupling the mounting arms, the biasing means being arranged to bias the mounting arms so as to move the glide members from the non-locking to the locking positions.

The locking member may be pivotally mounted with respect to the bogie beam.

The locking member may be coupled to the axle via a linkage.

The linkage may be pivotally mounted with respect to the bogie beam.

The linkage may include a slot arranged to receive a pin or roller attached to the locking member, the arrangement being such that movement of the linkage causes the pin or roller to move against a sidewall of the linkage defining the slot, so as to invoke said movement of the locking member.

The slot may be narrower at an end closest to the axle than at an end closest to the locking member.

The guide members may comprise rollers.

These and other aspects of the present invention will be apparent from, and clarified with reference to, the embodiments described herein.

Embodiments of the present invention will now be described, by way of example only, with reference to the accompanying drawings, in which:

EMBODIMENTS OF THE INVENTION

Figure 1:
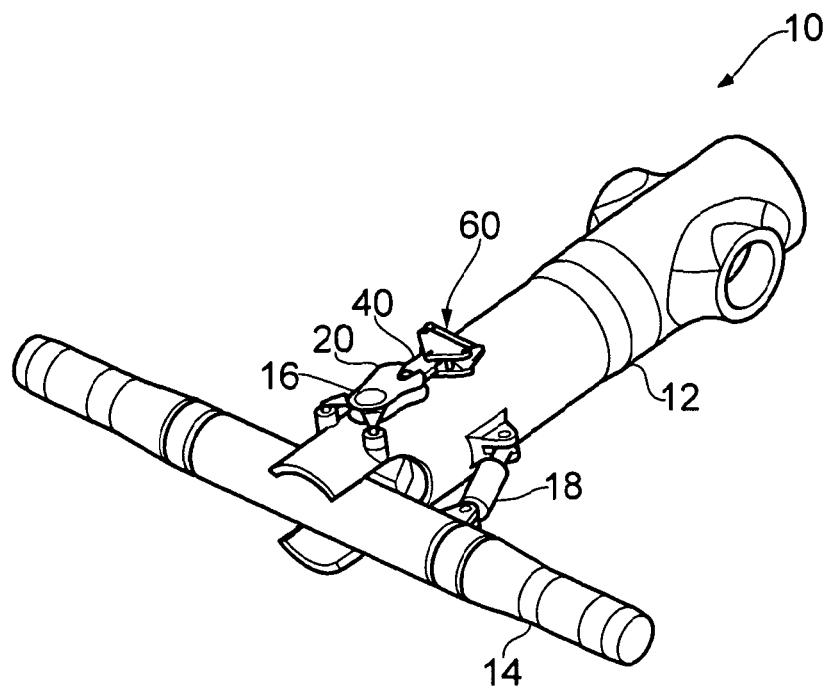
FIG. 1 shows a partial perspective view of a landing gear for an aircraft, according to an embodiment of the present invention.

Referring to FIG. 1, a perspective view of a landing gear 10 according to an embodiment of the present invention is shown. For clarity, the landing gear 10 has been shown without its wheels, strut, etc.

The landing gear 10 comprises an elongate body in the form of a bogie beam 12 to which are mounted a plurality of axles (only one of which is shown for clarity). The axles are generally orthogonal with respect to the bogie beam 12. The rear axle 14 is pivotally connected at a mid region thereof, to an end region of the bogie beam 12 via pivot pin 16. The pivot point thus defines an axis of rotation at its centre point. The rear axle 14 has a mounting region through which the pivot pin 16 passes. A steering actuator 18 is provided between the bogie beam 12 and the axle 14 to control the orientation of the axle 14 relative to the bogie beam 12. As will be discussed in more detail below, the landing gear 10 includes a locking device, which in this embodiment includes a locking member 40, a linkage 20 and a locking mechanism 60, together arranged to enable the rear axle 14 to be locked at a predetermined orientation with respect to the bogie beam.

It should be noted that in some embodiments of the present invention the landing gear 10 may not include a steering actuator 18 and the bogie beam 14 may carry any number of axles, any of which can be used in conjunction with a locking device according to embodiments of the present invention.

Figure 2:
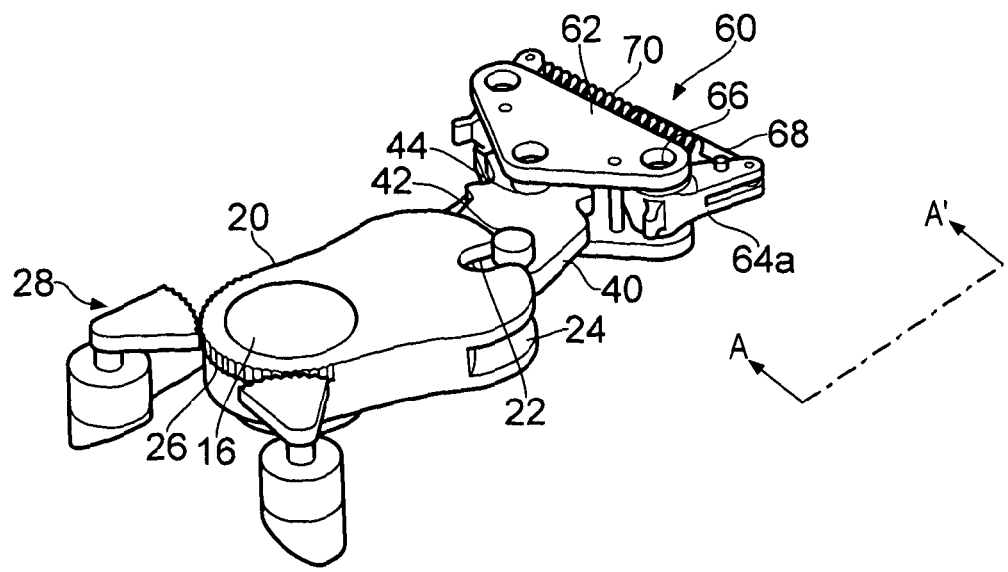
FIG. 2 shows a partial view of the landing gear of FIG. 1 focusing on the locking device thereof.

Referring to FIG. 2, a partial view of the landing gear of FIG. 1 is shown, focusing on the locking device thereof. The locking member 40 is elongate, generally plate-like and pivotally mounted with respect to the locking mechanism 60 about a pivot pin 44. A roller 42 is disposed so as to project upwardly from an upper face of the locking member 40. A second roller (not shown) is disposed so as to project downwardly from a lower face of the locking member 40, the two rollers 42 being coaxially aligned. An end region of the locking member 40 defines a cam surface (not shown in FIG. 2). Pivotal movement of the locking member 40 defines a swept volume, the swept volume being the volume of space swept by the region of the locking member 40 defining the cam surface.

The linkage 20 is arranged to couple the locking member 40 to the axle 14, via the pivot pin 16 of the axle 14. Thus, the axis of rotation of the linkage 20 and axle 14 are concentric in this embodiment. The linkage 20 is elongate, generally plate-like and includes a recess 24 at one end thereof. The recess 24 extends into the linkage 20 in a generally parallel plane with respect to the longitudinal axis of the linkage 20. A slot 22 extends through the linkage 20 in a generally orthogonal plane with respect to the longitudinal axis of the linkage 20. The slot 22 bisects the recess 24. The slot 22 is arranged to house the rollers 42 of the locking member 22. The recess 24 is arranged to receive the end region of the locking member 40 at which the rollers 42 are mounted, as the locking member 40 and linkage 20 move relative to one another. An end region of the linkage 20 furthest from the locking member 40 is attached to the axle pivot pin 16 by splines or the like, such that the linkage 20 is arranged to move in a directly proportional manner to the axle 14. A peripheral surface of the linkage includes a toothed portion 26 arranged to engage with a pair of rotary sensors 28 arranged to sense the angular position, or orientation, of the linkage 20 and/or the axle 14.

It should be noted that in some embodiments of the present invention the linkage 20 may be omitted, in such a case the locking member 40 being, for example, directly coupled to the axle 14, or mounted on the axle pivot pin 16, so as to move in a corresponding manner to the axle 14. The term "coupled" is used to mean directly or indirectly connected for corresponding movement. The term "corresponding movement" covers identical movement, proportional movement including directly proportional movement, similar movement and non similar movement. What is important is that movement of the axle between a first orientation and a second orientation causes the locking member to move in a linear relationship. Where a linkage is provided, the rollers 42 may be substituted for any low friction projection, or other suitable coupling means, such as a pin or the like. The use of a roller or other low-friction coupling results in smooth movement within the slot 22. In some embodiments the slot 22 may instead be provided in the locking member 40 and the rollers 42 may instead be provided on the linkage 20. In some embodiments the recess 24 may instead be provided in the locking member 40 to receive part of the linkage 20. Furthermore, in some embodiments of the present invention the rotary sensors 28 may be omitted or replaced by other sensors arranged to determine the orientation of the linkage 20 and/or the locking member 40 and/or the axle 14.

Figure 3:
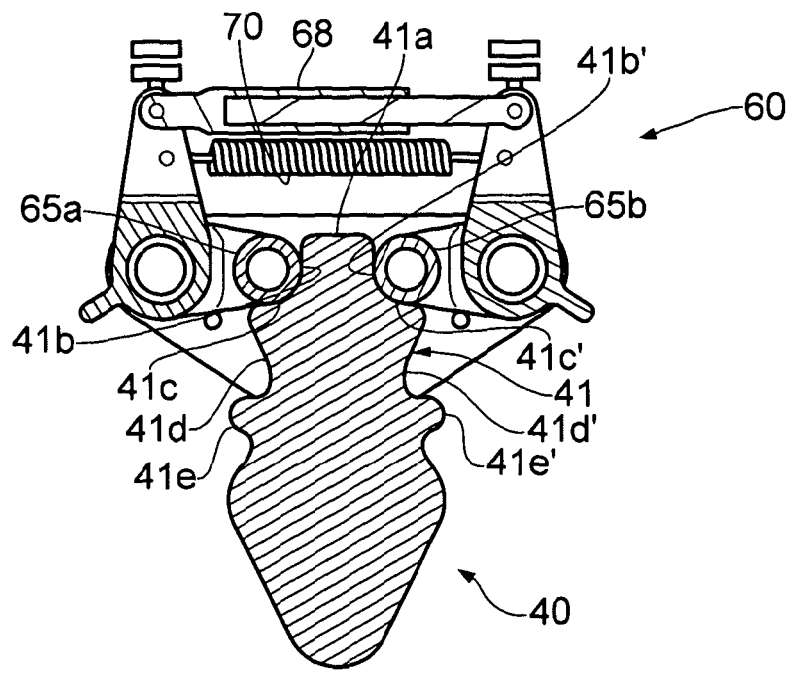
FIG. 3 shows a locking member and locking mechanism of the locking device of FIG. 2, in cross section, in a locking configuration.
Figure 4:
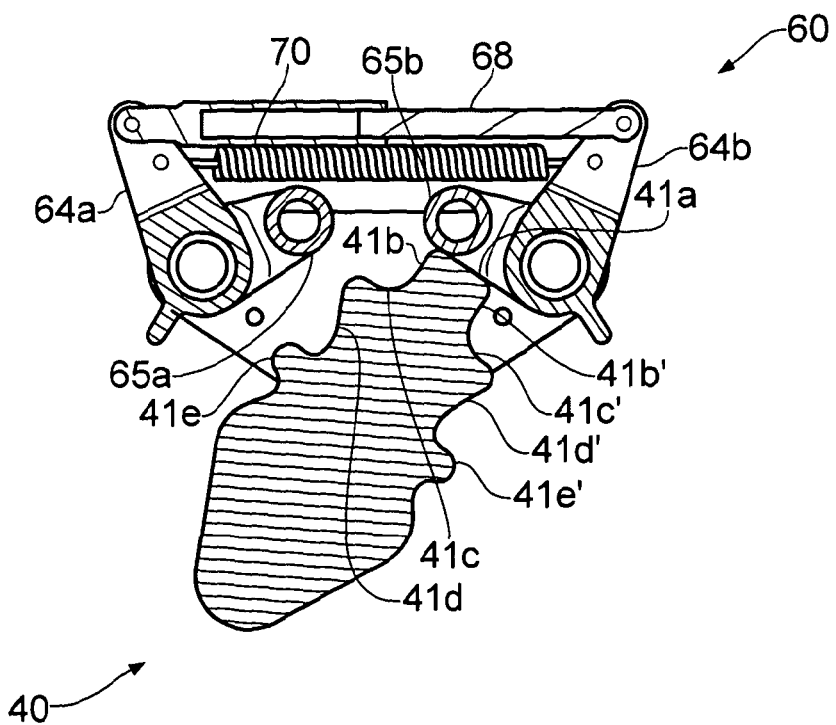
FIG. 4 shows the locking member and locking mechanism of FIG. 3, in cross section, in an non-locking configuration.

Referring to FIGS. 3 and 4, the locking member 40 and locking mechanism 60 are shown in cross section through A-A'. The locking mechanism 60 is arranged to lock the locking member 40 in a predefined orientation using one or more glide members. The locking mechanism 60 includes a pair of triangular plates 62, between which are disposed a pair of arms 64a, 64b. The arms 64a, 64b are pivotally mounted with respect to the triangular plates 62 by pivot pins 66. The arms 64a, 64b are generally "L" shaped, and pivotal about the region where the two orthogonal portions of the "L" meet. The arms 64a, 64b each carry a glide member, which in this embodiment of the present invention is in the form of a roller 65a, 65b. The locking mechanism 60 in this embodiment is thus in the form of a baulk lock. The arms 64a, 64b are arranged to move the rollers 65a, 65b between a locking position and an non-locking position (as described in more detail below). Because a roller 65a, 65b, or other type of glide member, has a low co-efficient of friction it can, in embodiments of the present invention, be moved from the locking position to the non-locking position easily and quietly, even when being loaded by the locking member 40.

It should however be noted that the locking mechanism according to embodiments of the present invention may take any suitable form arranged to move the one or more glide members between a non-locking position and a locking position and inhibit movement of the locking member 40 beyond a glide member when the glide member is in the locking position. As will be appreciated by a person skilled in the art, the term "glide" means to move or progress without difficulty or effort, or to move easily without noise. A glide member of embodiments of the present invention can take any suitable form that can provide a mechanical barrier to inhibit movement of the locking member 40 beyond it, whilst also defining a low-friction interface between the glide member and the locking member 40 such that the glide member can move out of contact with the locking member 40 in a relatively smooth and quiet manner when under load from the locking member. For example, a glide member could be a roller, a rounded, polished, metal part or the like.

In some embodiments the locking mechanism may include a sensing device, such as a proximity sensor, to detect when the rollers 65a, 65b are in their locking positions.

A portion of the sidewall of the locking member 40 defines the cam surface 41. The cam surface 41 is generally symmetrical about the longitudinal axis of the locking member 40. The cam surface 41 has a number of regions 41a-41e. The end of the locking member furthest from the linkage 20 defines a first guide region 41a of the cam surface 41. The first guide region 41a is generally planar and defines a plane that is generally orthogonal with respect to the longitudinal axis of the locking member. As illustrated in FIG. 4, the first guide region 41a is arranged to support the roller 65b when the arm 64b attempts to move the roller 65b towards its locking position whilst the locking member is orientated in a first position. The first position, in this embodiment, corresponds to the axle 14 having been pivoted anticlockwise to its maximum limit by retraction of the steering actuator 18. Consequently the locking member 40 is at its maximum angular displacement from its central position shown in FIG. 3. The first guide region 41 is arranged to guide the roller 65b towards the locking region 41b of the cam surface 41, as the locking member 40 pivots towards its central position, from the first position, in accordance with pivotal movement of the axle 14.

It should however be noted that some embodiments of the present invention may not include a first guide region 41a. In embodiments including a first guide region 41a, the first guide region 41a can take any suitable configuration that enables it to "catch" a glide member and guide it to a locking region during movement of the locking member 40 generally away from the glide member.

The locking region 41b of the cam surface 41 is generally planar and defines a plane that is generally orthogonal with respect to the plane of the first guide region 41a. The corner between the first guide region 41a and locking region 41b is smooth and rounded, so as to enable the roller 65b to smoothly pass between them. The general plane of the locking region 41b is generally orthogonal with respect to a line intersecting the axis of rotation of the arm 64b and the axis of rotation of the roller 65b, such that the roller 65b is generally over-centre when in the locking position.

It should however be noted that the locking region 41b can take any suitable configuration that a glide member can bear against so as to prevent the locking member 40 moving beyond the glide member.

A support region 41c' of the cam surface 41 extends from the locking region 41b, so as to define a support plane that is generally orthogonal to the plane of the locking region 41b. The support plane 41c' is arranged to support the roller 65b when the roller 65b is in the locking position adjacent the locking region 41b of the cam surface 41. The internal corner between the locking region 41b and support region 41c' is rounded.

It should however be noted that some embodiments of the present invention may not include a support region 41c. In embodiments including a support region 41c, the support region 41c' can take any suitable configuration that enables it to support a glide member whilst it bears against the locking region 41b.

A second guide region 41d of the cam surface 41 extends from the support region 41c' in a manner such that the locking member 40 tapers inwardly. The second guide region ends in a projection 41e, arranged to inhibit the roller 65b moving past. The surface of the second guide region 41d is slightly concave. A smooth, rounded corner is defined between the second guide region 41d and the support region 41c. The second guide region 41d is arranged such that, if the locking member 40 is in a third orientation which in this embodiment corresponds to the axle 14 having been pivoted clockwise to its maximum limit by extension of the steering actuator 18, the roller 65b is caught by the projection 41e and is in contact with the second guide region 41d. Movement of the locking member from the third orientation towards the first orientation causes the roller 65b to move along the second guide region 41d towards the locking region 41b.

It should however be noted that some embodiments of the present invention may not include second guide region 41d. In embodiments including a second guide region 41d, the second guide region 41d can take any suitable configuration that enables it to "catch" a glide member and guide it to a locking region during movement of the locking member 40 generally towards the glide member.

It should also be noted that some embodiments of the present invention may not include a projection 41e. In such a case, other means may be provided to ensure that glide member contacts the locking region 41b during movement of the locking member 40.

As mentioned above, the cam surface 41 is generally symmetrical about the longitudinal axis of the locking member 40 and consequently the cam surface includes a symmetrical pair of each of regions 41b to 41e, each pair of regions being arranged to interact with a respective roller 65a, 65b in the same manner. However, in other embodiments the locking member 40 may include a symmetrical pair of one or more of each of regions 41a to 41e and in some embodiments the one or more of each pair of regions 41a to 41e may be non-symmetrically disposed.

A telescopic actuator 68 is provided between the distal ends of the arms 64a, 64b with respect to the rollers. The telescopic actuator 68 can be extended so as to move the arms 64a, 64b such that the rollers move towards their non-locking positions. When the actuator 68 is retracted the arms move such that the rollers move towards their locking positions. It should however be noted that any suitable actuator may be provided to enable the one or more glide members to be moved between the locking position and non-locking position. In some embodiments the locking mechanism 60 may not include an actuator.

An extension spring 70 is provided between the distal ends of the arms 64a, 64b with respect to the rollers and arranged to bias the rollers towards the locking position, such that in the event of failure of the actuator 68, the spring 70 attempts to lock the orientation of the locking member 40 and thus the axle 14. It should however be noted that any suitable biasing means, such as a resiliently flexible biasing means, may be provided to bias the one or more glide members towards the locking position. In some embodiments the locking mechanism 60 may not include such a biasing means.

When a roller 65a, 65b is within its locking position, the roller is within the swept volume of the locking member 40 and the locking mechanism 60 is arranged to inhibit movement of the locking member 40 beyond the roller by contacting a respective locking region 41b of the cam surface 41. Consequently, the one of the arms 64a, 64b can be manipulated to place its roller within the locking position so as to inhibit the locking member 40 moving beyond the roller 65a, 65b, thereby preventing further movement of the locking member in that direction. In the illustrated embodiment, the locking mechanism inhibits the locking member 40 moving beyond a roller 65a, 65b due to the fact that, when the roller 65a, 65b is in the locking position and in contact with the locking region 41b of the cam surface 41, the roller 65a, 65b is over-centre with respect to the pivot point of its respective mounting arm 64a, 64b, such that a force opposing movement of the locking member 40, applied by the mounting arm 64a, 64b to the locking member 40 through the respective roller 65a, 65b, has substantially no lateral component with respect to a longitudinal axis intersecting the pivot points of the roller 65a, 65b and its mounting arm 64a, 64b. This is one example of how the locking mechanism 60 can be arranged such that when a glide member 65a, 65b is in its locking position, back-driving the mechanism does not result in the glide member 65a, 65b moving to its unlocking position and thus unlocking the axle 14.

When a roller 65a, 65b is in the non-locking position, the locking mechanism 60 is arranged to permit movement of the locking member 40 beyond the roller. The non-locking position of a roller 65a, 65b may overlap the swept volume. For example, in the illustrated embodiment, if the roller 65b is moved by its arm 64b to a position on the periphery of the swept volume, clockwise pivotal movement of the locking member 40 against the roller 65b will pivot the arm 54b in a clockwise manner such that the locking member 40 can move past the roller 65b.

In use, the axle 14 can be unlocked as follows. With the locking member 40 and thus the axle 14 locked in its central position, as depicted in FIG. 3, the actuator 68 is activated to extend. This causes the first arm 64a to pivot in an anticlockwise manner and the second arm 64b to pivot in a clockwise manner. The pivot movement of the arms 64a, 64b causes corresponding angular movement of the rollers 65a, 65b away from their over-centre locking positions. Any loading on the axle 14 results in the locking member 40 loading one of the rollers 65a, 65b. However, the loaded roller is arranged to move along and out of the locking region 41b, 41b' of the cam surface 41, providing low-friction unlocking. Once a roller 65a, 65b has moved out of its unlocking position, the locking member 40 can move beyond it, in some cases moving the roller 65a, 65b in the process.

In use, the axle 14 can be locked in a predetermined orientation as follows. With locking member 40 and thus the axle 14 in an off-centre position, as depicted in FIG. 4, the actuator 68 is activated to retract. This causes the first arm 64a to pivot in a clockwise manner and the second arm 64b to pivot in an anticlockwise manner. Movement of the first arm 54a will cause its roller 65a to enter its locking position and the arm will continue to move until it is caught by the first projection 41e', or in some embodiments by another limit stop, such as a pin or the like. The roller 65b of the second arm 64b contacts the first guide region 41a of the cam surface 41 and is supported thereby. The steering actuator 18 extends to move the axle 14, and thus the locking member 40, towards its central position. As the locking member pivots anticlockwise about its mounting axis, the first roller 65a travels along the third guide region 41d towards the first locking region 41b and the second roller 65b travels along the first guide region 41a towards the second locking region 41b'. As the locking member 40 approaches its central orientation, the first roller 65a passes over the external corner defined between the second guide region 41d and the first support region 41c and travels along the first support region 41c, due to the force biasing it against the cam surface 41 by the actuator 68 and spring 70, towards the first locking region 41b. Contact between the first roller 65a and the first locking region 41b inhibits further anticlockwise rotation of the locking member 40. Shortly prior to the first roller 65a contacting the first locking region 41b, the second roller 65b passes over the external corner defined between the first guide region 41a and the second locking region 41b' and moves onto, and is supported by, the second support region 41c'. The configuration is now as shown in FIG. 3, whereby the axle 14 is locked in its central orientation by the over-centre rollers 45a, 45b inhibiting movement of the locking member 40.

The landing gear according to embodiments of the present invention provides quiet locking and unlocking, due to the fact that locking and unlocking is achieved using glide members to mechanically restrain the locking member and in some embodiments to slide the glide members into and/or out of engagement with the cam surface of the locking member. This can be advantageous in comparison with locking devices using plain sliding surfaces, which when subjected to external loads can result in high unlocking loads due to friction. It also provides a baulk to prevent the locking member from moving past its lock position if the axle is moving quickly.

The landing gear according to embodiments of the present invention also enables full mechanical locking of the axle 14 as the axle 14 reaches its central position, rather than requiring the axle 14 to be accurately centred before the locking mechanism can engage.

What is claimed is:

1. A landing gear, including:
    a bogie beam;
    an axle pivotally connected to the bogie beam;
    a locking member coupled to the axle such that movement of the axle invokes movement of the locking member, said movement of the locking member defining a swept volume; and
    a locking mechanism coupled to the bogie beam and including first and second glide members, the locking mechanism being arranged to move the glide members between locking positions, where glide members are within the swept volume on opposing sides of the locking member with the locking member between them and in which position the locking mechanism is arranged to lock the locking member in a predetermined position, and non-locking positions, where the locking mechanism is arranged to permit movement of the locking member.

2. A landing gear according to claim 1, wherein the locking member includes a cam surface, the cam surface including first and second locking regions and a first guide region, the locking member and/or locking mechanism being arranged such that, with the locking member in a first position, movement of the first glide member from the non-locking position towards the locking position causes the first glide member to move into contact with the first guide region of the cam surface and, thereafter, movement of the locking member from the first position towards a second position causes the first glide member to travel along a portion of the first guide region towards the first locking region.

3. A landing gear according to claim 2, wherein the cam surface of the locking member includes a second guide region, the first locking region being between the first guide region and second guide region, the locking member and/or locking mechanism being arranged such that, with the locking member in a third position, the locking member moving through the second position when moving between the first and third positions, movement of the first glide member from the non-locking position towards the locking position causes the first glide member to move into contact with the second guide region of the cam surface and thereafter, movement of the locking member from the third position towards the second position causes the first glide member to travel along a portion of the second guide region towards the first locking region.

4. A landing gear according to claim 3, wherein the locking member and/or locking mechanism is arranged such that, with the locking member in the third position, movement of the second glide member from the non-locking position towards the locking position causes the second glide member to move into contact with the first guide region of the cam surface and, thereafter, movement of the locking member from the third position towards the second position causes the second glide member to travel along a portion of the first guide region towards the second locking region.

5. A landing gear according to claim 4, wherein the cam surface of the locking member includes a third guide region, the second locking region being between the first guide region and third guide region, the locking member and/or locking mechanism being arranged such that, with the locking member in the first position, movement of the second glide member from the non-locking position towards the locking position causes the second glide member to move into contact with the third guide region of the cam surface and thereafter, movement of the locking member from the first position towards the second position causes the second glide member to travel along a portion of the third guide region towards the second locking region.

6. A landing gear according to claim 5, wherein the cam surface of the locking member is generally symmetrical, the axis of symmetry bisecting the first guide region.

7. A landing gear according to claim 1, wherein the first and second glide members are mounted on first and second respective mounting arms.

8. A landing gear according to claim 7, wherein each mounting arm is pivotally mounted to pivotally move the first and second glide members between the locking and non-locking positions.

9. A landing gear according to claim 7, wherein, with the first and second glide members in the locking positions, the locking mechanism is arranged such that back-driving the locking mechanism does not cause a glide member to move from its locking to unlocking position.

10. A landing gear according to claim 7, including an actuator coupling the mounting arms, the actuator being arranged to move the mounting arms so as to move the glide members between the locking and non-locking positions.

11. A landing gear according to claim 7, including resiliently deformable biasing means coupling the mounting arms, the biasing means being arranged to bias the mounting arms so as to move the glide members from the non-locking to the locking positions.

12. The landing gear according to claim 7, wherein the first glide member is mounted at a free end of the first mounting arm and the second glide member is mounted at a free end of the second mounting arm.

13. A landing gear according to claim 1, wherein the locking member is pivotally mounted with respect to the bogie beam.

14. A landing gear according to claim 1, wherein the locking member is coupled to the axle via a linkage.

15. A landing gear according to claim 14, wherein the linkage is pivotally mounted with respect to the bogie beam.

16. A landing gear according to claim 14, wherein the linkage includes a slot arranged to receive a pin or roller attached to the locking member, the arrangement being such that movement of the linkage causes the pin or roller to move against a sidewall of the linkage defining the slot, so as to invoke said movement of the locking member.

17. A landing gear according to claim 16, wherein the slot is narrower at an end closest to the axle than at an end closest to the locking member.

18. A landing gear according to claim 1, wherein the glide members comprise rollers.

19. The landing gear according to claim 1, wherein movement of the axle causes corresponding movement of the locking mechanism when the glide members are in the non-locking positions.

20. The landing gear according to claim 1, wherein the axle is pivotally moveable in a first plane, wherein the glide members are pivotally moveable in a second plane that is parallel to the first plane.

* * * * *